US008600910B2

(12) United States Patent
Kara et al.

(10) Patent No.: US 8,600,910 B2
(45) **Date of Patent: *Dec. 3, 2013**

(54) SYSTEM AND METHOD FOR REMOTE POSTAGE METERING

(75) Inventors: Salim G. Kara, Ontario (CA); Martin J. Pagel, Kirkland, WA (US)

(73) Assignee: Stamps.com, San Monica, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 12/963,472

(22) Filed: Dec. 8, 2010

(65) Prior Publication Data

US 2011/0078091 A1 Mar. 31, 2011

Related U.S. Application Data

(63) Continuation of application No. 09/115,532, filed on Jul. 15, 1998, now Pat. No. 6,249,777, and a continuation of application No. 10/862,058, filed on Jun. 4, 2004, now abandoned, which is a continuation of application No. 09/644,623, filed on Aug. 23, 2000, now Pat. No. 6,368,391, which is a continuation-in-part of application No. 09/115,532, filed on Jul. 15, 1998, now Pat. No. 6,249,777, which is a continuation-in-part of application No. 08/725,119, filed on Oct. 2, 1996, now Pat. No. 5,822,739.

(51) Int. Cl.
*G06Q 30/00* (2012.01)
*G06F 17/00* (2006.01)
*G07B 17/02* (2006.01)

(52) U.S. Cl.
USPC .......................................... 705/336; 705/401

(58) Field of Classification Search
USPC .......................................... 705/410, 336, 401
See application file for complete search history.

(56) References Cited

U.S. PATENT DOCUMENTS 4,253,158 A 2/1981 McFiggans
4,376,299 A 3/1983 Rivest (Continued)

FOREIGN PATENT DOCUMENTS

EP 0137737 4/1985
EP 0 927 958 7/1999

(Continued)

OTHER PUBLICATIONS

Damas, “The E—Shipper’s Council”, American Shipper, 42, 4, 4; Apr. 2000.

(Continued)

*Primary Examiner* — Allen J Jung
(74) *Attorney, Agent, or Firm* — Fulbright & Jaworski LLP

(57) ABSTRACT

A system and method for remote postage metering of postage indicia, including demanding a desired postage amount and subsequently printing the postage indicia onto a piece of mail. A user inputs certain necessary information, as well as additional desired information, into a local processor-based system. The local system then assembles a postage demand in suitable format and transmits the same to a remote postage metering device. The remote postage metering device then verifies the demand for authority to demand and valid funding. Upon verification, the remote postage meter assembles a data packet representing an authorized postage indicia. The data packet is transmitted to the local system for printing. Printing of the postage indicia may be unaccompanied, or may include additional information. Such additional information may include destination and return address, machine readable routing or identification information, or a complete document to be posted.

14 Claims, 3 Drawing Sheets

(56) References Cited

U.S. PATENT DOCUMENTS 4,491,091 A 1/1985 Satterfield
4,511,793 A 4/1985 Racanelli
4,641,347 A 2/1987 Clark et al.
4,725,718 A 2/1988 Sansone et al.
4,743,747 A 5/1988 Fougere et al.
4,757,537 A 7/1988 Edelmann et al.
4,763,271 A 8/1988 Field
4,775,246 A 10/1988 Edelmann et al.
4,800,506 A 1/1989 Axelrod et al.
4,802,218 A 1/1989 Wright et al.
4,812,994 A 3/1989 Taylor et al.
4,831,554 A 5/1989 Storace et al.
4,831,555 A 5/1989 Sansone et al.
4,831,556 A 5/1989 Oono et al.
4,837,701 A 6/1989 Sansone et al.
4,858,138 A 8/1989 Talmadge
4,864,618 A 9/1989 Wright et al.
4,868,757 A 9/1989 Gil
4,873,645 A 10/1989 Hunter et al.
4,900,903 A 2/1990 Wright et al.
4,900,904 A 2/1990 Wright et al.
4,901,241 A 2/1990 Schneck
4,908,770 A 3/1990 Breault et al.
5,058,008 A 10/1991 Schumacher
5,065,000 A 11/1991 Pusic et al.
5,111,030 A 5/1992 Brasington et al.
5,150,407 A 9/1992 Chan
5,202,834 A 4/1993 Gilham et al.
5,233,657 A 8/1993 Gunther et al.
5,237,506 A * 8/1993 Horbal et al. ................. 705/403
5,239,168 A 8/1993 Durst, Jr. et al.
5,289,540 A 2/1994 Jones
5,319,562 A * 6/1994 Whitehouse .................. 705/403
5,323,323 A 6/1994 Gilham et al.
5,323,465 A 6/1994 Avarne
5,341,505 A 8/1994 Whitehouse
5,423,573 A 6/1995 de Passille et al.
5,454,038 A 9/1995 Cordery et al.
5,483,445 A * 1/1996 Pickering ........................ 705/40
5,490,077 A 2/1996 Freytag et al.
5,510,992 A 4/1996 Kara
5,583,779 A 12/1996 Naclerio et al.
5,602,743 A 2/1997 Freytag et al.
5,606,507 A 2/1997 Kara
5,606,613 A 2/1997 Lee et al.
5,619,571 A 4/1997 Sandstrom et al.
5,623,546 A 4/1997 Hardy et al.
5,649,118 A 7/1997 Carlisle et al.
5,655,023 A 8/1997 Cordery et al.
5,663,547 A * 9/1997 Ziarno .......................... 235/380
5,696,829 A 12/1997 Cordery et al.
5,706,502 A 1/1998 Foley et al.
5,715,314 A 2/1998 Payne et al.
5,717,596 A 2/1998 Bernard et al.
5,717,597 A 2/1998 Kara
5,729,674 A * 3/1998 Rosewarne et al. ........... 345/634
5,742,683 A 4/1998 Lee et al.
5,774,886 A 6/1998 Kara
5,778,076 A 7/1998 Kara et al.
5,796,834 A 8/1998 Whitney et al.
5,801,364 A 9/1998 Kara et al.
5,801,944 A 9/1998 Kara
5,812,991 A 9/1998 Kara
5,819,240 A 10/1998 Kara
5,822,739 A 10/1998 Kara
5,825,893 A 10/1998 Kara
5,860,068 A 1/1999 Cook
5,882,739 A 3/1999 Kobos et al.
5,923,885 A 7/1999 Johnson et al.
5,946,671 A 8/1999 Herring et al.
5,983,209 A 11/1999 Kara
6,005,945 A 12/1999 Whitehouse
6,061,670 A 5/2000 Brand
6,061,671 A 5/2000 Baker et al.
6,233,565 B1 5/2001 Lewis et al.
6,865,557 B1 3/2005 Cordery et al.
2001/0007086 A1 7/2001 Rogers et al.
2002/0032668 A1 3/2002 Kohler et al.
2002/0065577 A1 5/2002 Teraura et al.
2003/0065739 A1 4/2003 Shnier
2004/0122779 A1 6/2004 Stickler et al.

FOREIGN PATENT DOCUMENTS

EP 0 927 963 7/1999
WO WO-98/14909 4/1998
WO WO-9814907 4/1998
WO WO 98/57302 12/1998

OTHER PUBLICATIONS

Davis Brad L.; “Printing System for Preventing Injustice by Delivering Pring Data from Postal Charge Meter to Printer,” Jan. 2001.

* cited by examiner

SYSTEM AND METHOD FOR REMOTE POSTAGE METERING

CROSS-REFERENCE TO RELATED APPLICATIONS

The present application is a continuation of U.S. patent application Ser. No. 09/115,532 entitled "System and Method for Remote Postage Metering," filed Jul. 15, 1998, now U.S. Pat. No. 6,249,777, the disclosure of which is hereby incorporated by reference, and claims priority to the foregoing patent application through co-pending, commonly assigned U.S. patent application Ser. No. 10/862,058 entitled "Virtual Security Device," filed Jun. 4, 2004, which is a continuation of U.S. patent application Ser. No. 09/644,632, entitled "Virtual Security Device," filed Aug. 23, 2000, now U.S. Pat. No. 6,889,214, which is itself a continuation-in-part of U.S. patent application Ser. No. 09/115,532 entitled "System and Method for Remote Postage Metering" filed Jul. 15, 1998, now U.S. Pat. No. 6,249,777, which is itself a continuation-in-part of U.S. patent application Ser. No. 08/725,119 entitled "System and Method for Remote Postage Metering," filed Oct. 2, 1996, now U.S. Pat. No. 5,822,739, and the present application is related to U.S. patent application Ser. No. 08/729,669 entitled "System and Method for Determination of Postal Item Weight by Context," filed Oct. 2, 1996, now U.S. Pat. No. 5,983,209, and U.S. patent application Ser. No. 08/727,833 entitled "System and Method for Retrieving Postage Credit Contained Within a Portable Memory Over a Computer Network," filed Oct. 2, 1996, now U.S. Pat. No. 5,812, 991 which related applications are hereby incorporated by reference.

TECHNICAL FIELD

This invention relates, in general, to a system and method, under the control of general purpose computers, for transmitting an amount of authorized postage to a demanding processor-based system, and the subsequent imprinting of that transmitted postage on an item of mail. More specifically, the invention relates to a postage metering system that allows coupling a plurality of remotely located processor-based systems to a centralized metering device, by means of a publicly accessible gateway, whereby non-fungible postage is communicated from the metering device to specific ones of the plurality of remotely located processor-based systems.

BACKGROUND OF THE INVENTION

Presently, it is common for individuals or businesses to have residing within their offices a postage meter rented from a commercial supplier. This arrangement is very convenient, since letters may be addressed, postage applied, and mailed directly from the office without requiring an employee to physically visit the United States Post Office and wait in line in order to apply postage to what is often a quite significant volume of outgoing mail, or to manually apply stamps to each piece of mail in which case mail is slower because it has to go through a postage canceling machine.

Quite naturally, postage meters were developed to relieve the manual application of stamps on mail and to automate the above process. Nevertheless, a postage meter residing within an office is not as convenient and efficient as it may first seem to be. First, a postage meter may not be purchased, but must be rented. The rental fees alone are typically over twenty dollars per month. For a small business, this can be quite an expense to incur year after year. Second, a postage meter must be adjusted, serviced and replenished manually; e.g., each day the date must be adjusted manually, periodically the stamp pad must be re-inked, and when the amount of postage credit programmed within the postage meter has expired, the postage credit must be replenished. To be replenished, a postage meter must be manually unplugged, placed into a special case (the meter is of a significant weight), and taken to a United States Post Office to have the meter reprogrammed with additional postage credit. Upon arrival at the United States Post Office, a teller must cut the seal, replenish the meter with a desired amount of postage credit, and reseal the meter. The meter must then be returned to the office and powered up.

A slightly more expensive meter (rental of approximately $30.00 more) works in the following manner: 1) a user sets up an account with the meter supplier, 2) 7 to 10 days before a user requires any postage, the user deposits with the meter owner the amount of postage required, 3) the user then calls the owner (7 to 10 days later) and they issue instructions as to the manual pushing of a variety of buttons on the meter (programming) which will replenish the postage amount on the meter. Nonetheless, the meter must be taken to the Post Office every 6 months.

Thus, in addition to the monthly rent, the servicing and replenishing of the meter requires the time and expense of at least one employee to take the meter to the United States Post Office to have it checked. Of course, this procedure results in down-time wherein the postage meter is not available to the business for the application of postage to outgoing mail. In addition, because of the monthly rent and the size of these devices, it is generally not practical for businesses to have more than one postage meter to alleviate this down-time.

A more recent solution to postage metering is disclosed in U.S. Pat. No. 5,510,992 entitled SYSTEM AND METHOD FOR AUTOMATICALLY PRINTING POSTAGE ON MAIL, assigned to Post N Mail, L. C., Houston Tex., and is hereby incorporated by reference. There, the disclosed metering system provides for the sale of postage credit on portable processor devices to be later utilized as needed. However, such a system, although considerably more convenient than the traditional metering systems discussed above, still requires the prepurchase of postage credit in order to be available at the time of generating a postage indicia.

The alternative to a postage meter and its associated prepurchased postage credit to a business, especially a small business, is to forego the advantages of a postage meter and to buy sheets, or books, of stamps. Without a doubt, this is not a sufficient solution. A variety of denominations of stamps are generally required since applying two 32¢ stamps to a letter requiring only 40¢ will add up over time. Additionally, it is difficult for a business to keep track of stamp inventories, and stamps are subject to pilferage and degeneration from faulty handling. Moreover, increases in the postal rate (which seem to occur every three years) and the requirement for variable amounts of postage for international mail, makes the purchase of stamps even more inefficient and uneconomical.

Because of different postage zones, different classes of mail, different postage required by international mail and the inefficiency of maintaining stamps within an office, it is important to have an automatic postage system, such as the aforementioned inefficient and relatively expensive postage meter.

A need in the art therefore exists for a system and method that provides the correct amount of authorized postage on demand at locations other than a United States Post Office, while avoiding the use of a traditional postage meter or the use of any supply of postage credit at the demand site. Moreover, there is a need in the art for a system and method which allows the substantially instantaneous affixing of this authorized postage upon an item of mail after demand.

It is, therefore, advantageous for the provision of postage credit to be transmitted to demanding locations by a substantially automated system and method. Furthermore, any such system and method needs to maintain strict controls on the issuing of such indicia. These controls may provide verification of a request for postage so as to expose any rogue postage requests.

Additionally, it would be advantageous for any processor-based system providing postage metering requests and subsequent imprinting to interface with a user friendly operating environment that is flexible and which can be coupled to other programs such as word processing, spreadsheet, accounting, database, or graphics programs. It would further be advantageous for a processor-based system providing postage metering to also provide verification and/or updating of address information to ensure speedy and reliable delivery of mail pieces without requiring an operation to manually look-up or update such information.

BRIEF SUMMARY OF THE INVENTION

The present invention addresses the above-described problems of providing postage credit by providing a postage metering system and method whereby the metering of the postage, i.e., the assessing of payment and authorizing of postage, is accomplished at a remote location allowing access to a plurality of processor-based systems demanding postage. The postage demands are verified to ensure such demands are authorized to receive indicia of postage to be funded in accordance with the demand.

It will be appreciated that a technical advantage of the present invention is that a user can easily demand, fund, receive and print postage indicia from a processor-based system that does not include a postage metering device. A further technical advantage is that provision of postage indicia by the present invention is accomplished nearly instantaneously, thereby providing postage on demand.

Provision of postage indicia according to the present invention is substantially automated, thus requiring a minimum of operator involvement in the transmittal of postage credit. Furthermore, substantial automation in assessing the amount of postage required, as well as demanding, funding, receiving and printing postage indicia, results in a similar reduction in user involvement in utilizing the invention.

Further technical advantages are realized by the inclusion of encrypted data within, or accompanying postage indicia printed as a result of the present invention. Such advantages include the ability to identify rogue use of such postage indicia as well as both the metering and printing sites utilized with a particular postage indicia. Furthermore, by including a POSTNET bar code and/or including delivery point codes such as zip plus four plus two, a reduction in postage may be realized. Thus, use of the remote postage meter system is not only more convenient than a conventional postage meter but it can also save the user money on postage.

Technical advantages are realized by the communication of postal information associated with the demand for postage. In addition to the above mentioned advantage of lower postage costs by the inclusion of a communicated zip code as POSTNET bar coding accompanying the indicia, addressee information communicated to the remote metering device may advantageously be verified or corrected at the metering device. By transmitting the destination address of the postal item for which the indicia is to be generated, the remote metering device may verify or change the address to a format suitable for use by the issuing authority prior to its application on a postal item. Furthermore, omitted or erroneous information, such as zip code information, could be supplied or verified. Likewise, through the use of an address book, the use of shorthand representations of a desired destination address or other information may be utilized. Where this address book is stored centrally, the information may be automatically updated, or otherwise maintained in a current accurate state, without individual user attention. Of course, updating of an address in a particular user's address book may include notifying the user of the updated information, such as at the time of requesting postage for that particular address, or may simply provide the updated information, such as were only a zip code has changed.

These and other needs and advantages are met in a preferred embodiment of the present invention in which a first processor-based system (PC) is located within a business' office or an individual's home. The first PC stores a program, hereinafter referred to as the "Demand" program, accepts information from a user, a coupled device, or the context in which the postal item is being created or sent regarding the amount of desired postage and the mail piece for which it is needed. The demand program subsequently makes a demand for postage to a remote postage meter. The remote postage meter, itself a second processor-based system in the form of a PC, is located at a postage provider's office or other central source. The second PC stores a program, hereinafter referred to as the "Meter" program, which verifies postage demands and electronically transmits the desired postage indicia to the first PC in the form of a data packet. For security purposes, the data packet may be encrypted, or may include information allowing its use only by a selected Demand program, such as the Demand program actually demanding the postage. Subsequently, the Demand program receives the data packet and prints postage indicia, designating the appropriate amount of postage on a printer or special purpose label-maker coupled to the first PC. The postage indicia may contain encrypted information, such as transaction identification, the sender's and/or recipient's address or the Meter and/or Demand program serial number, to be utilized by the postal service for security or other purposes. The Demand program interfaces with the user through the display screen and an input device, such as a keyboard, or mouse. The data packet could contain the indicia for printing with a specific Demand program or it may contain data which allows the Demand program to generate its own indicia.

The Demand program may be coupled to a word processing program, or other process, residing within the first PC, thus allowing the user to request and subsequently print the postage indicia on correspondence or postal items generated by the coupled process. In such an arrangement, the Demand program may utilize information from the coupled process to determine a correct amount of postage from the context of the correspondence, such as size or weight of paper, draft or correspondence mode, etcetera. Additionally, the Demand program may be programmed to independently print a destination address and return address in addition to the postage indicia to be printed on an item of mail. Thereafter, an item of correspondence bearing the postage indicia can be placed in envelopes with cutouts or glassine paper at the appropriate areas so that the address, return address, and/or postage indicia can be visualized through the envelope.

In the preferred embodiment, the Demand program provides security at the demand site to prevent unauthorized utilization of the postage metering system. The appropriate level of security for any installation of the Demand program can be chosen by a principal at each location, thereby providing a distributed security system. Distributed security provides the ability for individual users of the postage metering system to select a level of security appropriate to prevent postal theft in their environment. Such distributed security does not increase the risk of postage loss at the remote meter as, regardless of the level of security chosen at the demand site, verification is performed by the Meter program to ensure each demand is valid and properly funded.

In addition, the Demand program can be used to transmit a variety of information to be encoded by the Meter program within the postage indicia using symbol technology. Such information is machine readable and can be used to identify postage indicia forgeries. The Demand or Meter programs may also encode a variety of information into a bar code that may be printed separately from the postage indicia. For example, the Demand program could automatically produce a "partial" indicia, such as zip+4 to be printed on the postal item. The remote Meter program will then, by knowing what the Demand program has produced or will produce, generate the remainder of the indicia to match this partial indicia. Thus, any attempt to intercept the indicia transmitted from the Meter program will result in a partial or mismatched indicia printed by the interceptor.

Provision of postage indicia by the remote meter of the present invention may also be utilized to provide anonymous postage. The Meter program may be programmed to issue authorized postage wherein the postage indicia ultimately printed does not include any identification of the demanding system. Although the United States Postal Service (USPS) currently requires postage meter identification on postage indicia, the remote metering system may be utilized to provide anonymity as the required meter identification may indicate the remote postal meter rather than any individual's postal meter.

An added advantage of the remote meter is that it may be utilized to provide postal address checking. A database of current postal addresses may be maintained at the remote meter site and utilized by the Meter program to verify the current address when postage is demanded. The dynamic nature of a current postal address database makes it inefficient to maintain such a database local to the user, but the centralization of the information allows the use of such a database more economically.

In the preferred embodiment, the Demand program is able to automatically calculate the correct postage to place on a letter, parcel or label as a function of the class, zone and weight of the particular item to be mailed. Alternatively, the Meter program is able to automatically calculate the correct postage from information contained within the demand. Also, a balance may be coupled to the first PC so that mail can be placed on the balance and the weight of the mail automatically entered into the Demand program for calculating the correct postage for that mail item. These calculations can be made locally or remotely, or as a combination of each.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figures 1A, 1B:
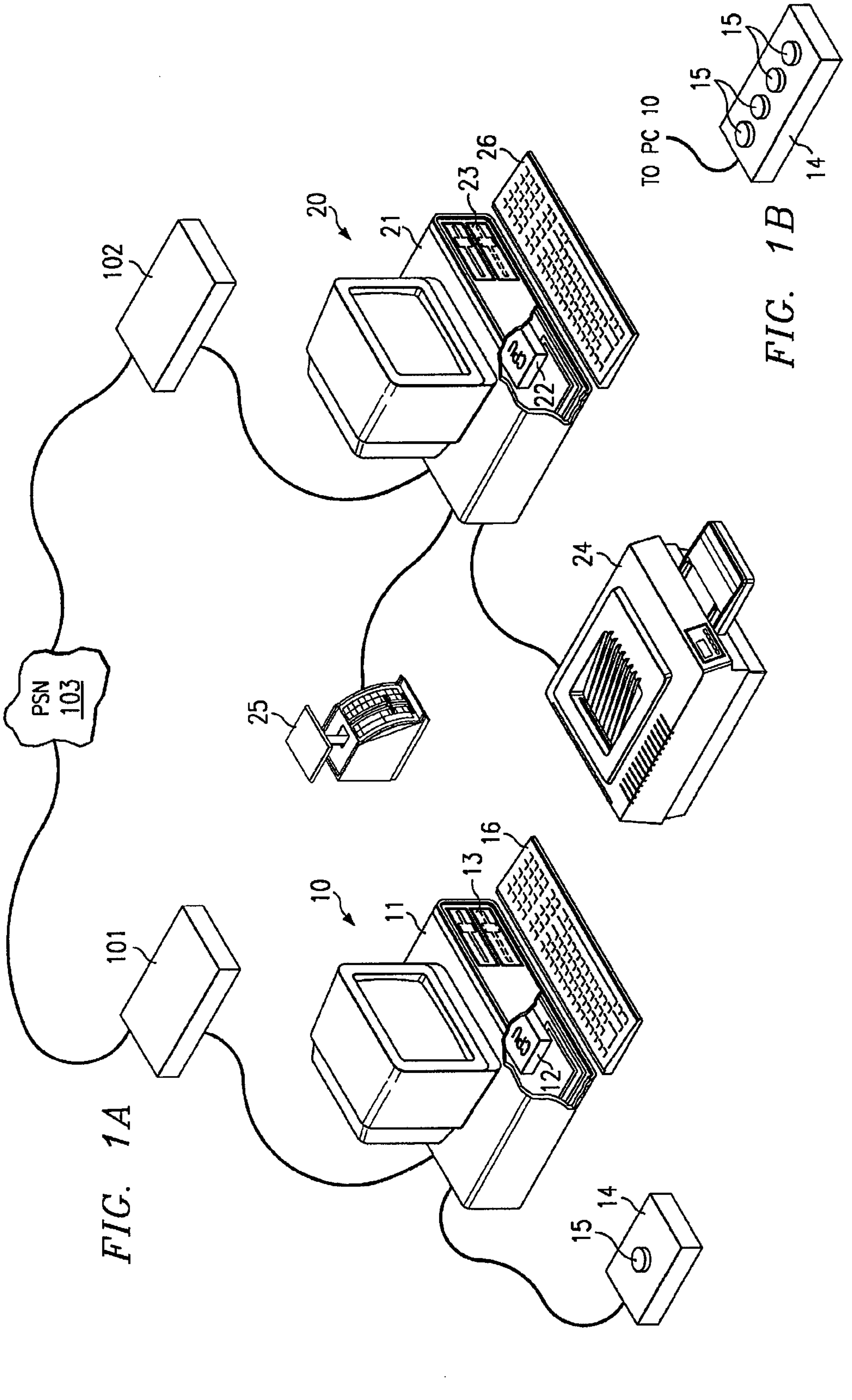
FIG. 1A illustrates processor-based systems of the preferred embodiment of the present invention.
FIG. 1B illustrates an alternative embodiment for coupling portable memories to the processor-based systems.

The present invention allows an individual to purchase a desired amount of postage at a location remote from a postal metering device, such postage being electronically transmitted to the individual nearly instantaneously upon demand. In a preferred embodiment the user invokes a first processor-based system (PC) to request and receive postage via a program, hereinafter referred to as the "Demand" program, stored on the first PC. The Demand program requests input from the user, coupled devices, or processes about the weight of the item to be mailed, the destination address, etc. The Demand program utilizes the input information to calculate the amount of desired postage for an item to be mailed. A demand for postage is then made to a remote metering system. This postage is to be subsequently printed by the first PC on an envelope, label or letter through a printer or special purpose label maker coupled to the first PC.

Although referred to herein as the Demand program, it shall be appreciated that a processor-based system may demand postage according to the present invention without actually storing a specific Demand program thereon. For example, an embodiment of the present invention may utilize a generic browser in order to operate a platform independent Demand program, such as an HTML or JAVA based web page served from a web server operating according to the present invention.

It should be understood that the Demand program, in addition to its unique process of creating a postage demand and subsequent printing of postage indicia, also may incorporate information processing modules common in the art. Such a processing module may be a data communications program for establishing and/or maintaining a link between the first and second PCs. Additionally, the Demand program may include an encryption module utilizing cryptographic key sets, hereinafter called postal purchase keys (PPK), for encrypting postage demands and decrypting the received data packet. Such processes are well known in the art and will not be discussed in detail in this specification.

The PPK may be distributed to the first PC in any number of ways. Since the PPK provides means by which a PC may decrypt a received data packet, it is advantageous to distribute such PPK by reliable secure means. One way to distribute the PPK is to provide them with the Demand program. An alternative means of distribution is by recording the PPK on a portable memory means such as, for example, a computer readable disk or a touch memory utility button (TMU), as disclosed in the above U.S. patent and referenced co-pending application, hereby incorporated by reference, and transmitting it by the mail.

The Demand program demands the postage from a remote postage metering device physically located away from the first PC. In the preferred embodiment the remote postage meter is itself a second PC, typically located at a postage provider's office. The remote postage meter stores a program, hereinafter referred to as the "Meter" program, which verifies postage demands and enables the Demand program to print the desired postage indicia by the transmission of a data packet.

Referring to FIG. 1A, there are illustrated processor-based systems 10 and 20 utilized in the preferred embodiment of the present invention. Specifically, PC 10 is utilized to implement the aforementioned Meter program and PC 20 is utilized to implement the Demand program. PC 10 includes chassis 11 enclosing processor (CPU) 12 and disk drive 13 and includes keyboard 16. Likewise PC 20 includes chassis 21 enclosing CPU 22 and disk drive 23 and includes keyboard 26. PCs 10 and 20 are general purpose computers, such as an IBM compatible (or Apple Macintosh) controlled by any general purpose operating system such as DOS or UNIX. It should be noted that PCs 10 and 20 may be computers of differing types and/or controlled by differing operating systems. Furthermore, PC 10 is preferably adapted for receiving postal credit stored in portable memory 15 through a receiving device 14.

In an alternative embodiment, disk drive 13 is utilized for storing postal credit received by PC 10, such as through modem 101. Of course, in this embodiment receiving device 14 and portable memory 15 may be omitted if desired. However, receiving device 14 and portable memory 15 may still be utilized in this embodiment, such as for the PPK as discussed below.

PC 20 may advantageously be coupled to a receiving device such as receiving device 14 depicted coupled to PC 10. The use of such a receiving device would facilitate the use of a portable memory device, such as portable memory 15, to transmit the PPK utilized by the invention. It will be appreciated by those skilled in the art that the use of a portable memory device to store the PPK allows for both the transmittal of the PPK from a postage supplier to the user by a known trustworthy means. Furthermore, by having the ability to removably couple the PPK to PC 20 and/or PC 10, added security is accomplished by the simple removal of the portable memory device and thus the PPK.

Postage credit to be distributed to demanding PCs may not initially be input into PC 10, but rather the amounts of postage credit transmitted to ones of PC 20 may be recorded at PC 10. Thereafter, the postal authority, through which the transmitted postage credit is to be utilized, is compensated by the postage provider. However, where a postal authority has not authorized a postage provider to distribute postage credit without first compensating the postal authority, it may be advantageous to utilize a receiving device such as a modem (not shown) whereby direct communications to a postal service may be utilized to receive postal credit such as may be stored in portable memory 15 or disk drive 13. Alternatively, a receiving device, such as receiving device 14, suitable for coupling PC 10 with a TMU button, such as portable memory 15, containing an information record of prepaid postage credit may be utilized.

Directing attention to FIG. 1B, an alternative embodiment of receiving device 14 is shown. Here receiving device 14 is adapted to allow simultaneous coupling of a plurality of portable memory 15 to PC 10. Accordingly, an array of portable memories 15 may be utilized by PC 10 in order to service multiple simultaneous users, i.e., multiple ones of PC 20 coupled thereto demanding postage according to the present invention. Likewise, an array of portable memories 15 may be utilized by PC 10 in order to provide a total amount of postage credit desired, such as where a postal authority limits the value of postage which may be stored in a single portable memory and it is desired to provide a total amount of postage available for satisfying demands in excess of this limit.

Of course, the array of portable memories discussed above may be coupled to the host processor-based system through the use of individual receiving devices, such as multiples of the embodiment of the receiving device shown in FIG. 1A, rather than that shown in FIG. 1B. Moreover, there is no limitation to the plurality of postage credits utilized by the present invention being stored in a portable memory. For example, multiple amounts of postage credit, possibly replenishable by communication through modem 101 as discussed above, may be utilized to provide service for multiple demands or a desired total amount of postage credit.

It shall be appreciated that the portable memories themselves, the data files storing postage credit, and/or the processor-based system, may be secured in order to provide security for postage credit, if desired. For example, the portable memory may be physically secure and tamper resistant, data files storing postage credit may be secured through the use of encryption algorithms, or the processor-based system may be disposed in a secure environment.

Referring again to FIG. 1A, it can be seen that PCs 10 and 20 may be linked together through Public Switched Network (PSN) 103 via modems 101 and 102. PSN 103 may be comprised of any number of now existing or later to be developed communications means. In the preferred embodiment, PSN comprises public telecommunications lines and switching equipment. Alternatively, PSN 103 comprises digital communication over the Internet or similar wide area public gateway. Additionally, PCs 10 and 20 may be linked directly through digital telecommunications trunks (not shown) or through a digital network system, cable system, or satellite system (all not shown). It shall be understood that in utilizing a digital network system to link PCs 10 and 20 that modems 101 and 102 are replaced by network interface cards (NIC) or other digital communications devices, e.g., ISDN. It will be appreciated by those of skill in the art that any network linking PCs 10 and 20 may either be secure or not depending on the degree of postage credit transmission security desired.

With further reference to PC 20 illustrated in FIG. 1A, printer 24 and balance 25 are depicted. Printer 24 is coupled to CPU 22 and provides printing means for the postage indicia and is, of course, optional if printing of the postage indicia is not desired. Balance 25 is also coupled to CPU 22 and provides automated input of the weight of a postal item into the Demand program. Of course, balance 25 is optional, and input of postal item weight may be accomplished manually by an operator or automatically from a coupled process, such as a word processor, if desired.

Figure 2:
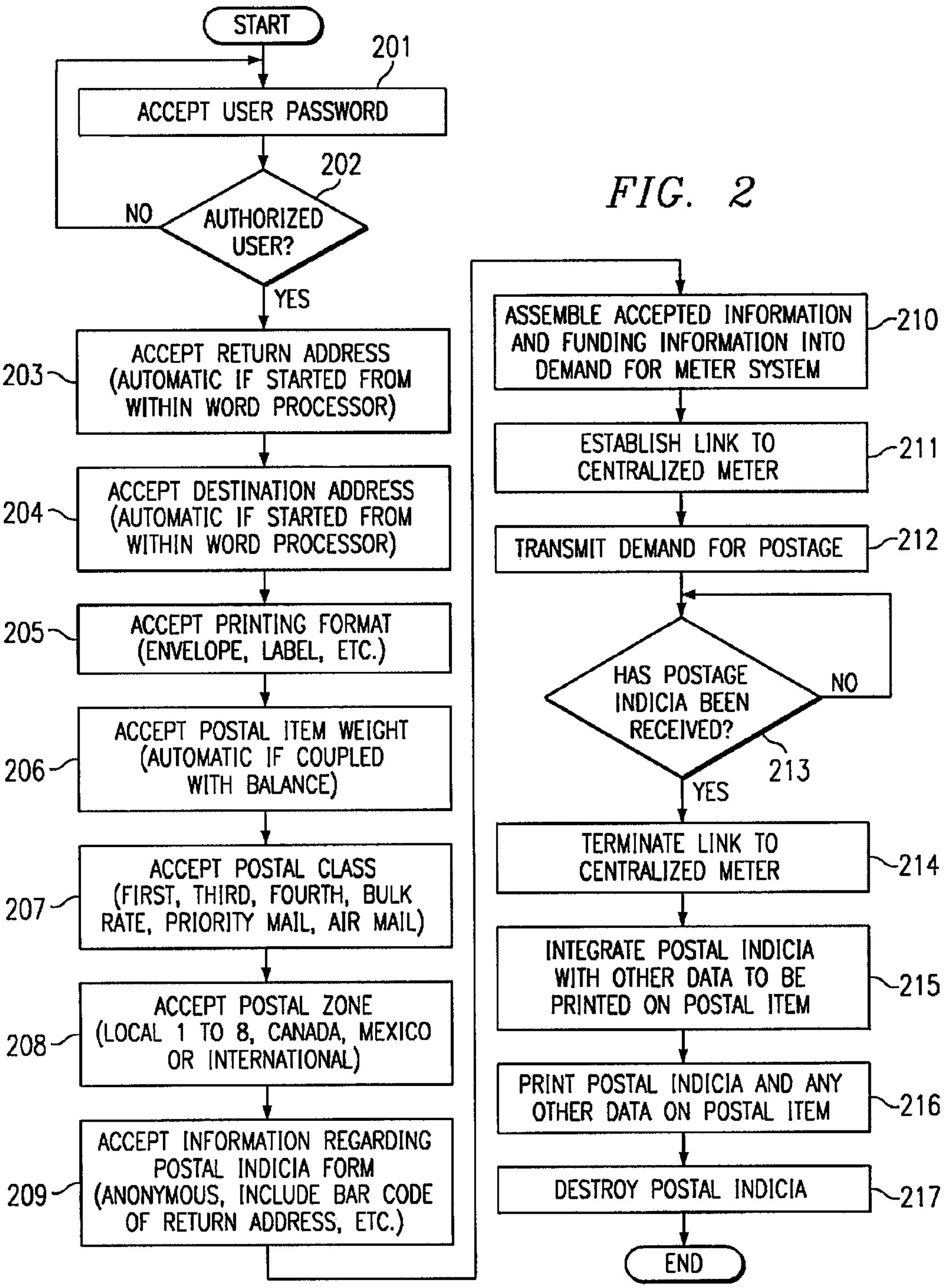
FIG. 2 illustrates a flow diagram of the demand process of the present invention.

Directing attention to FIG. 2, a flow diagram of the preferred embodiment of the Demand program is depicted. Upon activation of the Demand program, the user is asked for, and the process accepts, a user password (step 201). At step 202, the Demand program determines if the accepted password is valid. If the password is not valid, the process returns to step 201, thus preventing unauthorized access to postage. If the password is valid, the process continues to step 203.

Of course, password acceptance and verification steps 201 and 202 may be eliminated, thus providing no password security for the process, if desired. Alternatively, password acceptance and verification steps 201 and 202 may be accomplished at a different point in the process than illustrated in FIG. 2.

At step 203 the Demand program accepts the postal item sender's return address. As indicated in step 203, the return address may be communicated to the Demand program automatically if the Demand program is coupled with another process, such as a word processing program. Furthermore, the return address information may be utilized by the Demand program to later print the return address along with the postage indicia on a postal item. If determined to be advantageous, such as, for example, if required by a postal authority, the return address information may also be transmitted to the remote postage metering system for inclusion in a generated data packet or for validation of the postage demand. The return address information can also be encoded within a generated postage indicia in such a way as to be machine readable and thus suitable for utilization in preventing postal fraud.

Alternatively, return address acceptance step 203 may be eliminated if desired. Specifically, where anonymous postage indicia is desired, acceptance of return address information is not necessary to the generation of acceptable postage indicia.

At step 204 the Demand program accepts the postal item destination address. The address information may be utilized by the Demand program to later print the destination address along with the postage indicia on a postal item. Moreover, the destination address information may also be transmitted to the remote postage metering device for inclusion in a generated data packet or for validation of the correct address. Of course, address acceptance step 204 may be eliminated if desired.

As indicated in step 204, the address may be communicated to the Demand program automatically if the Demand program is coupled to another process such as a word processing program. Moreover, the destination address information provided in step 204 may be a shorthand designation of a desired destination address. Accordingly, an address book or database may be utilized by the present invention in completing the destination address. This address book may be stored locally, such as by PC 20 generating the demand according to the present invention, or may be central, such as at PC 10 metering the postage according to the present invention. As will be discussed in detail below, there are advantages provided in centrally storing such address information. Additionally, whether stored locally or centrally, an address book or other database may be utilized to provide additional information utilized in demanding and printing postage according to the present invention. For example, selection of a particular shorthand, and thus a particular destination address, may also select a printing format, a postal zone, a postal class, and/or information regarding the postal indicia form utilized as discussed below. Alternatively, the short hand designation may be utilized to select any of the above information items either alone or in any combination.

At step 205 the Demand program accepts printing format information to be utilized when ultimately printing the postage indicia. Such formats may include predefined sizes of envelopes and labels as well as user defined items. The Demand program uses the format information for adjusting the postage amount for the size of the postal item as well as for determining the size of postage indicia to be printed. In addition, the printing format information may also be utilized by the remote metering device for such purposes as determining what information to include in a generated data packet. Printing format acceptance step 205 may be eliminated if desired.

At step 206 the Demand program accepts the postal item's weight. As indicated in step 206, the weight may be communicated to the Demand program automatically from a balance in data communication with the Demand program. Of course, the Demand program may also accept weight information through other means, such as keyboard 26.

However, weight information may also be calculated by the Demand program from other information, thus eliminating the need for any direct input of weight. For example, information regarding the printing format, such as accepted in step 205, as well as specific document information, such as is generally available in word processing or other applications, may be utilized by the Demand program to determine the weight. In example, the Demand program weight determination may use information regarding the size and number of pages as well as the context of the document, such as word processing draft, from a coupled word processor in combination with the aforementioned printing format.

It shall be appreciated, simply by knowing the size and number of pages of correspondence, that generally a very close approximation of the required postage may be calculated based on a standard or common paper weight and envelope size. However, this approximation may be made more precise by inputting information regarding the specific envelope or container to include the correspondence, such as may be determined from the above accepted printing format or may be input directly in a step not shown. Additionally, the precision of the postage determination may be increased by the input of the actual paper weight to be used by the correspondence. This information may be provided by a manual input step (not shown) or May be determined automatically, such as from information as to the context of the document provided by the coupled application.

It shall be appreciated that a user may assign certain paper weights and/or sizes to particular document contexts either within the Demand program (not shown) or within a coupled application. For example, correspondence quality printing from a word processor may be associated with 20 pound bond paper, whereas draft quality printing from the same word processor may be associated with 15 pound paper. Similarly, printing of invoices or statements from an accounting program may be associated with two parts, or two copies, of 15 pound paper. Of course, paper size as well as print quality may be supplied by the coupled process or may be manually input. Thereafter, this information may be utilized by the Demand program to precisely determine the weight, and therefore the proper postage required to post such items, without the need to either weigh the postal item or input its weight.

Preferably, the weight information, or information used in its determination, is utilized by the Demand program in the automatic calculation of the necessary amount of postage for the postal item. However, this information may instead be transmitted to the remote postage metering device for inclusion in a generated data packet or for calculation of the necessary amount of postage.

At step 207, the Demand program accepts the postal item's postal class. The class information is utilized by the Demand program in the automatic calculation of the necessary amount of postage for the postal item. Optionally, the postal class information is transmitted to the remote postage metering device for inclusion in a generated data packet.

At step 208, the Demand program accepts the postal item's postal zone. The zone information is utilized by the Demand program in the automatic calculation of the necessary amount of postage for the postal item. Optionally, the postal zone information is transmitted to the remote postage metering device for inclusion in a generated data packet.

If desired, postal item weight acceptance or determination step 206, postal class acceptance step 207, and postal zone acceptance step 208 may be replaced by a step simply accepting a desired postage amount.

At step 209, the Demand program accepts postage indicia information to be utilized by the remote metering device when generating a data packet. Such information may include indicating the desire for anonymous postage indicia or inclusion of return and/or destination address in machine readable format to be contained within the printed postage indicia. It shall be appreciated that the postage indicia information may not only be utilized by the remote metering device in generation of a data packet, but may be utilized by the Demand program when printing the postage indicia on a postal item. Postage indicia information acceptance step 209 may be eliminated if desired.

Steps 203 through 209 are not illustrated in this sequence because of any limitation of the present invention, and may be performed in any order with respect to each other according to the present invention.

Subsequent to accepting information, the Demand program assembles predetermined portions of this information into a demand which is of a format suitable for communication to, and acceptance by, a remote metering device (step 210). Preferably, assembly step 210 includes the substeps of determining what information the user desires to be included in the generated postage indicia, determining if an accompanying bar code is desired, and if so, determining what information is to be included therein, and determining the amount of postage the postage indicia should indicate. These substeps provide means by which the Demand program creates a demand for postage suiting the user's needs and desires without the need to transmit superfluous data across PSN 103. Reducing the data transmitted in the demand to only that which is necessary to generate the desired postage indicia serves to reduce the communication time necessary to transmit the demand. This in turn reduces the cost involved in the transmittal, as the communication link may be maintained for a shorter time as well as the user being idle for a shorter time while waiting on transmission and response.

Certain data stored within PC 20 is also included within the demand. Such data includes a public encryption key from the PPK. It is well known in the art that information encrypted using a public encryption key is only decryptable using a corresponding, and presumably private, decryption key. Therefore, the public key of the PPK included within the demand corresponds to a private decryption key of the PPK held at PC 20. Inclusion of a public encryption key within the demand, facilitates the encryption by the metering system of a generated data packet so that it might only be meaningfully utilized at the demanding PC holding the private decryption key.

Additionally, data included within the demand includes a method of funding the transaction and a serial number contained within the Demand program or other unique data. The included serial number or unique data is utilized by the remote metering device for validation of the demand. Of course, inclusion of additional information within the Demand program may be eliminated if desired.

It shall be appreciated that information indicating a method of funding the transaction may be stored within system 20, such as on disk drive 23, to be included within the demand by the Demand program. Similarly, such information may be incorporated into the Demand program itself, such as, for example, where a debit or deposit account is established with the postage provider at the time of initializing the Demand program. Of course, an additional information acceptance step (not shown) may be added to the Demand program whereby the user inputs information regarding the funding of the postage demand.

Assembly step 210 includes the use of an encryption process to encrypt the demand which is to be sent via PSN 103. Subsequent to the assembly of the demand, the Demand program initiates a public key encryption process well known in the art to encrypt the demand. Therefore, meaningful use of the encrypted demand may only be accomplished by decrypting the demand with a private key available only to the remote metering device. Of course, this encryption substep may be eliminated if desired.

Subsequent to assembling the demand, the Demand program establishes a link between PCs 20 and 10 (step 211). The link established in step 211 is a link suitable for data communications between PCs 10 and 20, such as PSN 103 illustrated in FIG. 1A. In the preferred embodiment, linking step 211 includes the substeps of dialing a data communications access phone number, providing information as to which resource available through the data communications access is to be utilized, and verifying that data communications with a remote metering system has been accomplished.

Establishing a link between PCs 10 and 20 may be accomplished at a point in the process other than that illustrated in FIG. 2. It is advantageous to utilize as temporally short of communications link as possible in situations where there is a time dependent charge involved for maintaining such links. However, there is no limitation of the present invention to establish and terminate the communications link. For example, where digital telecommunications trunks (not shown) or a digital network system (not shown) are utilized for linking PCs 10 and 20, a data communication link may advantageously be maintained for extended periods of time.

It shall be appreciated that the step of establishing a link between PCs 10 and 20 may include authentication of the user. For example, where the link between PCs 10 and 20 is via the Internet, the step of establishing a link there between may include use of the SSL protocol, well known in the art, to authenticate the user. Authentication may likewise be accomplished through the use of transmission of an encryption, i.e., transmission of an encrypted string and the clear text string for authentication of the encryption at the remote site, interchange of an encrypted string where a first system transmits a value encrypted and the second system must decrypt the value and re-encrypt the value using a different key for decryption at the firs system, transmission of unique identification information comparable to a database at the remote system, etcetera. Such authentication of the user may be used in combination with the aforementioned encryption of data packets or may be used in the alternative, if desired.

Upon establishing the link in step 211, the demand is transmitted to PC 10 (step 212). The Demand program then monitors the link for receipt of a returned data packet at step 213, returning to step 213 if no postage indicia has yet been received. After receipt of the data packet the link between PCs 20 and 10 is terminated (step 214). However, as discussed above, there is no limitation requiring termination step 214 to be accomplished at all or in the order depicted in FIG. 2.

Step 215 involves integrating the data packet with any other data to be printed on the postal item. A substep of decrypting the received data packet, utilizing a private key of the PPK held at the demanding system, is utilized if encryption is desired. Decryption of the data packet near the time of printing the postage indicia is advantageous in preventing postal fraud accomplished by multiple uses of a single data packet. However, decryption may be accomplished at any time prior to printing the postage indicia. Of course, step 215 may be omitted if integration with other data or encryption is not desired.

It shall be understood that as an alternative, or in addition, to the use of encryption in the transmission of the data packet, a system wherein the transmitted data packet only contains information sufficient to enable the forming of a portion of the desired postage indicia may be used if desired. Such a system provides added security by requiring the receiving PC to generate, or otherwise match, the remaining portion of the postage indicia in a form so as to complete the transmitted portion of the indicia. In a preferred embodiment, the Meter program selects the portion of postage indicia to transmit based on a record of past demands by the particular Demand program. Likewise, the Demand program selects the remaining portion of a postage indicia to print based on a similar record of past demands. It will be appreciated that it is very unlikely that any PC, intercepting the transmission of the demand or the resulting data packet, would be able to predict the correct content of the remaining portion of a postage indicia to be printed. Therefore, an extra measure of security against rogue use of the postage indicia is afforded by such a system.

The data integrated with the data packet by step 215 may include sender's return address, destination address, or postal instructions, such as class of mail or special handling instructions. Where the Demand program is coupled with another process, such as a word processor, spreadsheet, accounting, database, or graphics program, the other data may include an entire document created by this other process. An advantage realized by the inclusion of other data with the data packet at time of printing is that hand addressing or multiple printing of postal items is not necessary to imprint both postage indicia or any other information.

At step 216, the Demand program causes PC 20, in conjunction with printer 24, to print the postage indicia and any integrated data upon a postal item. Step 216 utilizes portions of the information accepted at steps 203 through 209 to produce a printed result suitable for the user's needs and desires. Printing format information accepted at step 205 is utilized to determine the size, format, and placement of the printed postage indicia. Moreover, depending on user preference, other information, such as postal class, may also be included on the postal item as printed.

The process of the Demand program concludes with the destruction of the data packet upon successful printing of the postage indicia on a postal item (step 217). Preferably, the Demand program monitors PC 20 for errors associated with an unsuccessful print process before destroying the data packet. Alternatively, the Demand may query the user as to the success of the printing process.

Destruction of the data packet is advantageous in discouraging postal fraud, but is not required by the present invention. As discussed above, the postage indicia itself may include machine readable information to aid in the detection of postal fraud. Such information may include return address, destination address, date, time, or unique information such as the Demand program serial number or a transaction number. This machine readable information could be utilized by the postal service to detect postal fraud by such indicators as destination address on the postal item and encoded within the postage indicia not matching.

Furthermore, including a unique transaction number within the printed postage indicia aids in the detection of postage fraud. This unique transaction is machine readable, and upon two occurrences of the same transaction number, postage fraud is indicated. Moreover, a transaction number may be generated so as to indicate the remote postage metering device that originally distributed the postage credit. With this information, determination of the demanding PC is a simple process of reviewing transaction logs at the remote metering device.

Upon completion of the steps illustrated in FIG. 2, the Demand program may either terminate its execution, thus returning control of PC 20 to another process, or return to an earlier step to continue the process again. It shall be understood that, although the foregoing discussion disclosed the demand for a single postage indicia, multiple ones of the postage indicia may be demanded in any session. Such multiple demands are advantageous in situations where a large amount of mail requires postage. These situations often present themselves in a business environment.

Figure 3:
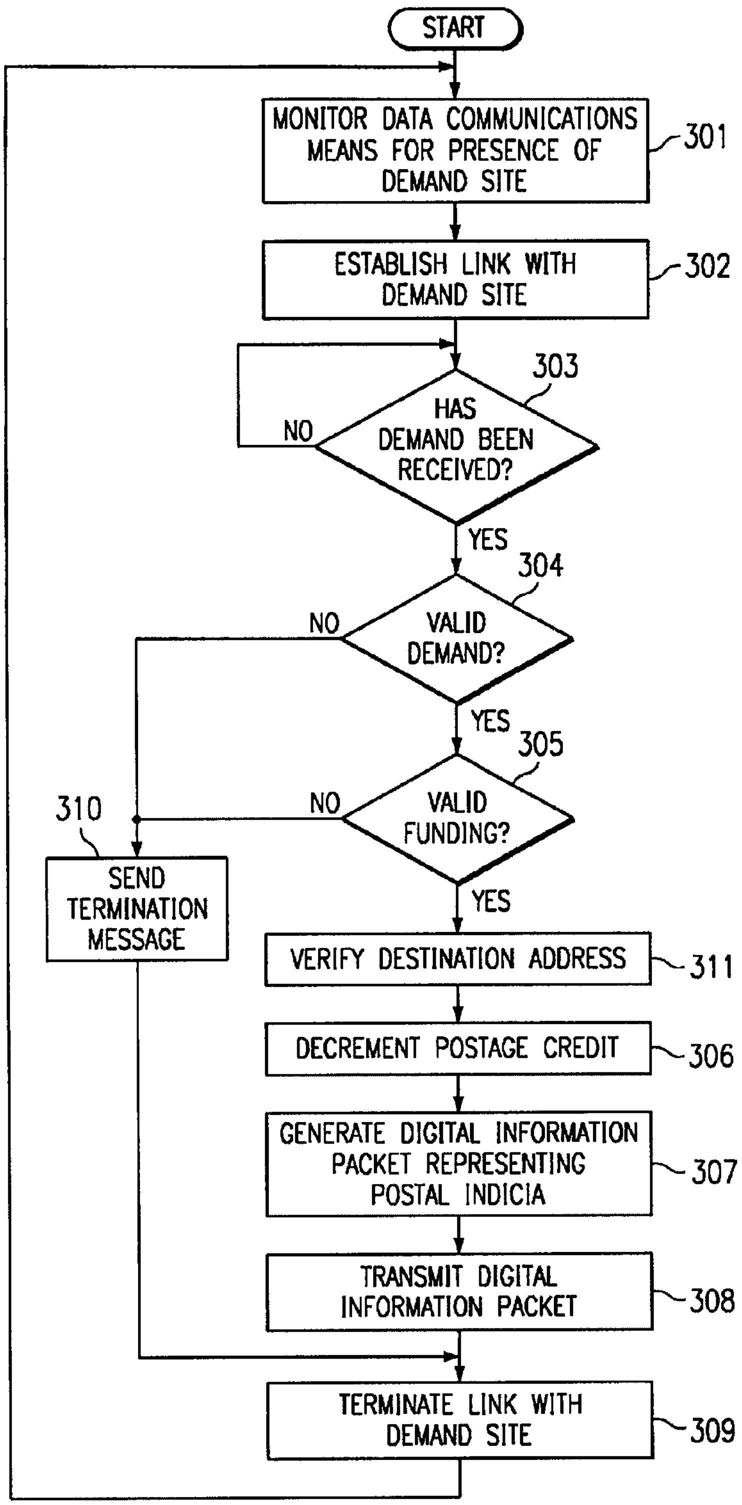
FIG. 3 illustrates a flow diagram of the meter process of the present invention.

Having explained in detail the Demand program of the preferred embodiment of the present invention, attention is directed to FIG. 3, wherein a flow diagram of the preferred embodiment of the Meter program is depicted. Upon execution of the Meter program, data communications are monitored for the presence of a demand site (step 301). When the Meter program detects the presence of a demand site, a link capable of data communication is established at step 302. As discussed in association with the Demand program, establishing a link between PCs 10 and 20 may be accomplished at a point in the process other than illustrated in FIG. 3. For example, in an alternative embodiment, where digital telecommunications trunks (not shown) or a digital network system (not shown) are utilized for linking PCs 10 and 20, a data communication link may advantageously be maintained for extended periods of time.

Likewise, as discussed above, establishing a communication link may include steps of authentication of the user of PC 20. Accordingly, where the communication link is the Internet, for example, the SSL protocol may be utilized to authenticate a user prior to a connection between PCs 10 and 20 useful for the transfer of postage there between is established.

Subsequent to establishing a data communications link, the Meter program accepts a demand transmitted from a demand site (step 303), returning to step 303 if no demand has yet been received. Accepting a demand includes the substep of decrypting the demand utilizing a decryption key available at PC 10 where encryption of the demand is used.

At step 304, the Meter program validates the demand and, if found valid, proceeds to step 305. Validation is preferably accomplished by verifying selected information contained within the demand against validation data available at PC 10. Data unique to the demand site, such as the Demand program's serial number or the Demand program's communication link address (e.g., telephone number, Internet address, or E-Mail address), may be utilized in verification step 304. Additionally or alternatively, validation may include other information such as a determination that the received demand is in a proper format or is encrypted using a particular known key. An advantage of the verification process is that added system security is realized as a result of reducing the possibility of a rogue being able to independently create a valid demand. Of course, where rogue demands for postage are not a concern, validation step 304 may be eliminated.

It shall be understood that encryption of the demand and validation of the demand may be used in the disjunctive or the conjunctive to achieve a desired level of security. Furthermore, as discussed above, the transmission of a partial postage indicia may also be utilized to provide security against unauthorized use of postage indicia.

If it is determined that a demand is invalid, a termination message explaining the reason for denying the demand is transmitted to the demanding site at step 310. Thereafter, the Meter program terminates the data communication link between systems PCs 10 and 20 (step 309) and begins monitoring the data communications device for the presence of a demand site. However, where it is advantageous to maintain the data communications link between PCs 10 and 20, the determination of an invalid demand will not result in termination of the data communications link. Instead, the Meter program sends a message indicating the cause for denial (step 309) and then again monitors for demands (step 303).

At step 305, the Meter program uses funding information found within the demand to determine if proper funding is available for the transaction. Funding for the postage demanded may be accomplished in various ways. The user of the on-demand postage system may have a credit or debit account with the postage provider or may utilize point of sale funding methods such as a valid bank card account. Use of credit and debit accounts require the user to supply the postage provider with certain information prior to the postage demand. In the case of a credit account, the user may be periodically billed for postage previously demanded. In the case of a debit account, the user prepays for postage to be demanded in the future. Upon making demands for postage, costs of the transaction are deducted from the user's debit account. In the case of a bank card account being utilized, the provider will demand payment from the bank card company concurrent with the postage demand. In some situations, credit could be maintained at the local site and transmitted with the indicia request.

Funding the transaction may involve both the amount of the postage necessary to post the postal item and a charge by the postage provider for the on-demand postage service. Accordingly, the amount of the postage is determined by the Demand program by utilizing available information, including the postal item weight, in conjunction with postal rate information maintained in a database stored on disk drive 23 within PC 20. Alternatively, the amount of postage may be determined by the Meter program by utilizing information within the demand, including the postal item weight or information sufficient for its determination, in conjunction with postal rate information maintained in a database stored on disk drive 13 within PC 10. Of course, the amount of postage may also be input directly by the user making the demand if desired.

If it is determined that proper funding is not available, a termination message explaining the reason for denying the demand is transmitted to the demanding site at step 310. Thereafter, the Meter program terminates the data communication link between PCs 10 and 20 (step 309) and begins monitoring the data communications device for the presence of a demand site. Where it is advantageous to maintain the data communications link between PCs 10 and 20, the determination of lack of proper funding will not result in termination of the data communications link. Rather, the Meter program sends a message indicating the cause for denial (step 309) and then again monitors for demands (step 303).

Upon determination of proper funding, the Meter program may check the destination address included in the demand to verify that it is a proper address (step 311), if desired. Of course, where address verification or updating is not desired, step 311 may be omitted.

Address checking is preferably accomplished by comparing the destination address to a database of addresses stored, for example, on disk drive 13 within PC 10. Accordingly, corrected or updated destination address information, such as a new zip code, additional zip code digits such as zip plus four plus two, forwarding addresses, or the like may be provided for use both within the meter stamp to be generated as well as at the demanding system for posting the mail piece.

Additionally, as discussed above, the destination address may be a shorthand designation of a desired destination address and/or other information. Accordingly, where an address book, or other database, of information associated with a particular user or demanding system is maintained at PC 10, step 311 may include reference to the database in order to determine the desired information, such as the destination address. It shall be appreciated that this embodiment of the present invention provides several advantages. Specifically, as only a shorthand designation of a potentially long string of information is communicated, more efficient use of the available bandwidth may be realized. Additionally, as information, such as the destination address, is maintained at a centralized system, this information may be easily and constantly updated as well as updated off line in order to more quickly service demands for postage. For example, as a postal customer files a notice of change of address, this centrally stored address book may be updated to reflect the changed information. It shall be appreciated that the central address book or other database may not in fact store a complete set of the desired information, but may instead store pointers to a common database, such as an official postal service database, in order to facilitate updating of the information for example.

Other information stored in this centralized database may, as mentioned above, provide particular selections with respect to the meter stamp and/or mail piece being generated. Moreover, the database of this embodiment of the present invention may provide mail piece content, such as the text of a form letter or the like to be posted with the demanded postage.

Upon determination of proper funding and verification of the destination address, the Meter program increments a record of the amount of postage credit transmitted for later compensation to the Postal Authority. Alternatively, the Meter program deducts the amount of postage to be used by the postage indicia from a postage credit, such as may be stored in a portable memory 15 coupled to PC 10 through receiving device 14, available at PC 10 (step 306). Where multiple amounts of postage credit are stored at PC 10, such as through the use of the aforementioned array of portable memories, step 306 may include a determination of an available postage credit for use in the present transaction. Such a determination may include a determination as to a particular postage credit not currently utilized in responding to a demand for postage from another Demand program, a particular postage credit having sufficient value to provide the demanded amount of postage, a determination of a combination of postage credits suitable for providing the demanded amount of postage, or the like.

It shall be appreciated that the Meter program may itself be provided with postage credit through such means as authorization by an official postal service, direct connection to a postal service office, or portable electronic postage credit. The details of the provision of postage credit to the Meter program is not shown, but may be, for example, the system shown in above referenced and incorporated U.S. Pat. No. 5,510,992.

The Meter program utilizes information contained within the demand to generate a data packet representing the desired postage indicia (step 307). The data packet includes information required of a valid postage indicia by a postal service. Such information may include the date of posting, the amount of the postage, a unique transaction identifier, and identification of the metering device. The information may also include data to be printed with the postage indicia, such as the sender's return address, at the user's preference. Moreover, this information, or portions thereof, may be encrypted or digitally signed, such as through interaction with a secure device such as portable memory 15, to provide for authentication of the postage meter stamp. However, such a process may require a significant amount of processor time. Accordingly, where such schemes are utilized, the preferred embodiment of the present invention utilizes the aforementioned array of postage credit storage devices in order to provide accelerated service of simultaneous demands from a plurality of systems.

The data packet is a digital representation or image of the postage indicia to be ultimately printed by the demanding site. Such a representation may be accomplished by any number of graphic image formats well known in the art. Such formats include PDF, JPEG, GIF, POSTSCRIPT, PCL, or any other suitable format of graphics data. It will be appreciated by those skilled in the art that the provision of the data packet in a graphics format provides a form of security as proprietary image generation algorithms may be withheld from public use. When utilizing such a graphic image format, any information that the user desires to be included within the postage indicia must be transmitted to the Meter program for inclusion in the data packet. Of course, the use of a graphic image format is optional and may be replaced by any other suitable means for transferring the postage indicia.

For example, the data packet may be digital information sufficient to enable the Demand program to construct a valid postage indicia image either by completing a portion of a transmitted digital image or by generating a postage indicia using data suitable to enable generation contained in the data packet. This embodiment has the advantage of being bandwidth efficient in that less data is transmitted than when utilizing a complete graphic image and any information to be included in the postage indicia may remain at the demand site. The disadvantage to generating the postage indicia image at the demand site is that the image generation algorithm must be distributed to the users, and is thus more susceptible to unauthorized utilization.

At step 308 the data packet generated from the received demand is transmitted via the data communications link to the demand site. Thereafter, the data communications link is terminated between PCs 10 and 20. However, it shall be understood that, as discussed above, there is no limitation requiring termination step 309 to be accomplished in the order depicted in FIG. 3. Where it is advantageous to maintain the data communications link between PCs 10 and 20, termination step 309 may be accomplished at some time other than upon transmittal of the generated data packet.

Although a preferred embodiment has been disclosed, one of skill in the art will appreciate that the present invention may be accomplished by various other means. For example, rather than using the Demand program at PC 20, a simple e-mail program might be used to transmit the necessary information to a remote metering device. E-mail programs are well known in the art and are capable of providing the encrypted bidirectional information communication desirous in the present invention.

Furthermore, PC 10 may advantageously be a public information server such as a web server on the Internet. Such an implementation of PC 10 is very conducive to an e-mail implementation of PC 20 as discussed above.

Moreover, although the preferred embodiment discloses use of the present invention to transmit postal indicia from a remote metering device, it shall be understood that the present invention may be utilized to transmit any form of indicia. For example, the present invention may be utilized to enable users to purchase event admittance tickets from a remote ticket metering or dispensing system, and to subsequently print acceptable tickets on their general purpose printers. Such a system may be useful in the sporting or transportation industry, for example.

Although the present invention and its advantages have been described in detail, it should be understood that various changes, substitutions and alterations can be made herein without departing from the spirit and scope of the invention as defined by the appended claims.

What is claimed is:

1. A computer program product having computer program logic recorded on a non-transitory computer readable medium for generating postage, the computer program product comprising:

code for receiving a demand for generation of at least one postage indicium from a program operable upon a remote user terminal, the program operable upon the remote user terminal being a program which was developed for an application other than postage indicia generation;

code for generating the demanded at least one postage indicium upon receipt of said demand for generation of at least one postage indicium from the program operable upon the remote user terminal; and code for providing the generated at least one postage indicium to the program operable upon the user terminal for printing the provided at least one postage indicium, wherein the at least one postage indicium is generated remotely from the user terminal.

2. The computer program product of claim 1, wherein the program operable upon the remote user terminal is an e-mail program.

3. The computer program product of claim 1, wherein encrypted bidirectional information communication is provided between the program operable upon the remote user terminal and the code for receiving a demand and the code for providing the generated at least one postage indicium to the program.

4. The computer program product of claim 1, wherein the code for receiving a demand for generation of at least one postage indicium, the code for generating the demanded at least one postage indicium, and the code for providing the generated at least one postage indicium to the program operable upon the user terminal comprises a web server application operable upon the Internet.

5. The computer program product of claim 1, wherein the generated at least one postage indicium is provided to the program operable upon the remote user terminal by the code for providing the generated at least one postage indicium in a digital representation of the at least one postage indicium.

6. The computer program product of claim 5, wherein the digital representation of the at least one postage indicium comprises a graphic image format.

7. The computer program product of claim 6, wherein the graphic image format is selected from the group consisting of a PDF format, a JPEG format, a GIF format, a POSTSCRIPT format, and a PCL format.

8. A method comprising:

creating, by a program operable upon a user terminal, a demand for generation of at least one postage indicium from a postage indicia generation system, the program operable upon the user terminal being a program which was developed for an application other than postage indicia generation, wherein said user terminal comprises a computer processor;

transmitting, by the user terminal, the demand for the generation of at least one postage indicium from the user terminal to the postage indicia generation system; and receiving, by the program operable upon the user terminal, the at least one generated postage indicium in response to transmitting the demand, wherein the at least one postage indicium is generated remotely from the user terminal.

9. The method of claim 8, wherein the program operable upon the user terminal is an e-mail program.

10. The method of claim 8, wherein encrypted bidirectional information communication is provided between the program operable upon the user terminal and the postage indicia data generation system.

11. The method of claim 8, wherein the postage indicia data generation system comprises a web server application operable upon the Internet.

12. The method of claim 8, wherein the at least one generated postage indicium is provided to the program operable upon the user terminal by the postage indicia data generation system in a digital representation of the at least one postage indicium.

13. The method of claim 12, wherein the digital representation of the at least one postage indicium comprises a graphic image format.

14. The method of claim 13, wherein the graphic image format is selected from the group consisting of a PDF format, a JPEG format, a GIF format, a POSTSCRIPT format, and a PCL format.

* * * * *

UNITED STATES PATENT AND TRADEMARK OFFICE

CERTIFICATE OF CORRECTION

PATENT NO. : 8,600,910 B2
APPLICATION NO. : 12/963472
DATED : December 3, 2013
INVENTOR(S) : Kara et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 113 days.

Signed and Sealed this
Twenty-first Day of July, 2015

Michelle K. Lee

Michelle K. Lee
*Director of the United States Patent and Trademark Office*